United States Patent
Fu et al.

(10) Patent No.: US 9,350,525 B2
(45) Date of Patent: May 24, 2016

(54) METHOD FOR PROCESSING PDSCH DATA

(71) Applicant: Samsung Electronics Co., Ltd., Suwon-si, Gyeonggi-do (KR)

(72) Inventors: Jingxing Fu, Beijing (CN); Chengjun Sun, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 14/395,298

(22) PCT Filed: Apr. 10, 2013

(86) PCT No.: PCT/KR2013/002978
§ 371 (c)(1),
(2) Date: Oct. 17, 2014

(87) PCT Pub. No.: WO2013/168900
PCT Pub. Date: Nov. 14, 2013

(65) Prior Publication Data
US 2015/0055522 A1    Feb. 26, 2015

(30) Foreign Application Priority Data
May 7, 2012   (CN) .......................... 2012 1 0138614

(51) Int. Cl.
*H04W 72/04*    (2009.01)
*H04W 72/12*    (2009.01)
(Continued)

(52) U.S. Cl.
CPC ................ *H04L 5/14* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2009/0249153 A1   10/2009  Zhang
2011/0176461 A1   7/2011   Astely et al.
(Continued)

FOREIGN PATENT DOCUMENTS

WO    2010/086498 A1    8/2010

OTHER PUBLICATIONS

Ericsson et al., Specification impact of TDD traffic adaptation, R1-121709, 3GPP TSG-RAN WG1 #68bis, Jeju, Korea, Mar. 26-30, 2012.

*Primary Examiner* — Christopher Crutchfield
(74) *Attorney, Agent, or Firm* — Jefferson IP Law, LLP

(57) ABSTRACT

An embodiment of the present invention provides a method for processing Physical Downlink Shared Channel (PDSCH) data, to be applied in a system, which supports to adjust uplink and downlink (UL-DL) configurations for Time Division Multiplexing (TDD) dynamically. The method includes: receiving, by a User Equipment (UE), a System Information Block 1 (SIB1); obtaining, by the UE, from the SIB1 a TDD UL-DL configuration employed by the UE in current system, in which the UE doesn't support dynamic service adaption; determining, by the UE, subframe type of subframe 6, wherein the subframe type of subframe 6 is a special subframe or a normal downlink subframe; and determining, by the UE, number of Orthogonal Frequency Division Multiplexing (OFDM) symbols used for PDSCH transmission within subframe 6, based on the subframe type of subframe 6, and processing the PDSCH data of subframe 6. By adopting the technical solution provided by embodiments of the present invention, in a system which supports to dynamically adjust the TDD UL-DL configurations, a UE may be enabled to explicitly learn number of OFDM symbols used for the PDSCH transmission within subframe 6. Meanwhile, the UE and an evolved Node B (eNB) may be enabled not to confuse the number of OFDM symbols used for the PDSCH transmission.

12 Claims, 6 Drawing Sheets

---

UE receives SIB 1, and obtains from SIB 1 the TDD UL-DL configuration employed by the UE, which doesn't support dynamic service adaption in current system — 401 the UE determines subframe type of subframe 6, which includes special subframe and normal downlink subframe — 402 the UE determines number of OFDM symbols used for the PDSCH transmission within subframe 6, according to subframe type of subframe 6, and processes the PDSCH data of subframe 6 — 403

(51) Int. Cl.
*H04L 5/14* (2006.01)
*H04L 5/00* (2006.01)
*H04L 1/18* (2006.01)

(52) U.S. Cl.
CPC ........... *H04L 1/1861* (2013.01); *H04L 5/0007* (2013.01); *H04L 5/0087* (2013.01); *H04L 5/1469* (2013.01); *H04W 72/042* (2013.01); *H04W 72/0446* (2013.01); *H04W 72/1205* (2013.01); *H04W 72/1278* (2013.01); *H04W 72/1284* (2013.01); *H04W 72/1289* (2013.01); *H04L 5/0044* (2013.01)

(56) References Cited

U.S. PATENT DOCUMENTS

| | | |
|---|---|---|
| 2011/0211503 A1 | 9/2011 | Che et al. |
| 2012/0188877 A1* | 7/2012 | Chin et al. .................... 370/241 |
| 2012/0287828 A1* | 11/2012 | Chen et al. .................... 370/280 |
| 2012/0294203 A1* | 11/2012 | Koorapaty et al. ........... 370/280 |
| 2013/0044652 A1* | 2/2013 | Wang et al. ................... 370/280 |
| 2013/0163484 A1* | 6/2013 | Ihm et al. ..................... 370/280 |
| 2014/0056185 A1* | 2/2014 | Yu ................................. 370/280 |

* cited by examiner

METHOD FOR PROCESSING PDSCH DATA

TECHNICAL FIELD

The present invention relates to wireless communications systems, and more particularly, to a method for processing Physical Downlink Shared Channel (PDSCH) data in a system, which supports to adjust Time Division Duplexing (TDD) uplink and downlink (UL-DL) configurations dynamically.

BACKGROUND ART

Long Term Evolution (LTE) system supports two duplexing modes, that is, Frequency Division Duplexing (FDD) and TDD. FIG. 1 is a schematic diagram illustrating a frame structure in a TDD system. Length of each radio frame is 10 ms, which is divided into two half-frames. Length of each half-frame is 5 ms. Each half-frame includes 8 time slots and 3 special domains. Length of each time slot is 0.5 ms. The 3 special domains refer to Downlink Pilot Time Slot (DwPTS), Guard Period (GP) and Uplink Pilot Time Slot (UpPTS). Sum of length of each special domain is 1 ms. Each subframe consists of two consecutive time slots, that is, $K^{th}$ subframe includes time slots 2k and (2k+1). TDD system supports 7 kinds of UL-DL configurations, which are shown in Table 1. In Table 1, D represents a downlink subframe. U represents an uplink subframe. S represents a special subframe which includes 3 special domains mentioned above.

TABLE 1

| Config-uration index | Period of switching point | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Based on Table 1, subframes 3, 4, 7, 8, and 9 are downlink subframes in some TDD UL-DL configurations. Meanwhile, subframes 3, 4, 7, 8 and 9 are uplink subframes in TDD UL-DL configurations. These subframes 3, 4, 7, 8 and 9 may be referred to as flexible subframes.

Theoretically, to adapt to service changes, a cell may employ TDD UL-DL configurations, which are different from that of an adjacent cell. Currently, changing TDD UL-DL configurations may be implemented with System Information Block type 1 (SIB1). However, changing delay of SIB1 is 640 milliseconds. SIB1 may only change 32 times every 3 hours at most, which may not better adapt to UL-DL service amount changes. To better adapt to the UL-DL service amount changes, when UL-DL service ratio doesn't match with a ratio of uplink subframe and downlink subframe in the TDD UL-DL configuration, the TDD UL-DL configuration may be adjusted timely.

One implementation method is as follows. Evolved Node B (eNB) may dynamically adjust the TDD UL-DL configurations, according to UL-DL service ratio changes. The eNB may also indicate direction of a flexible subframe, with scheduling information in a Physical Downlink Control Channel (PDCCH). User Equipment (UE) may determine whether a flexible subframe is an uplink subframe or a downlink subframe, by detecting the PDCCH, which is shown in FIG. 2. In FIG. 2, suppose the TDD UL-DL configuration indicated by SIB1 is TDD UL-DL configuration 2. Subframes 3, 4, 7, 8 and 9 are flexible subframes. That is, a corresponding flexible subframe may be determined as an uplink subframe or a downlink subframe, by detecting whether the PDCCH is uplink allocation authorization or a downlink allocation authorization. Suppose scheduling of uplink PUSCH and Hybrid Automatic Repeat Request (HARQ) comply with TDD UL-DL configuration 1. Thus, when detecting the uplink grant allocation authorization from subframe 1, subframe 7 is an uplink subframe. When detecting the downlink assignment allocation authorization from subframe 7, subframe 7 is a downlink subframe.

During the process of determining whether a flexible subframe is an uplink subframe or a downlink subframe, by using the uplink grant allocation authorization or the downlink assignment allocation authorization, the UE neither receive the uplink grant uplink allocation authorization from subframe 1, nor receive the downlink assignment downlink allocation authorization from subframe 7. Thus, the UE may not determine whether subframe 7 is an uplink subframe or a downlink subframe. However, the UE receives the downlink assignment downlink allocation authorization from subframe 6. And then, the UE doesn't learn whether subframe 6 is a special subframe or a normal common downlink subframe. Since when the eNB converts subframe 7 into an uplink subframe, subframe 6 should be a special subframe according to Table 1. When the eNB converts subframe 7 into a downlink subframe, subframe 6 should be a normal downlink subframe. However, since the UE neither receive the uplink grant from subframe 1, nor receive the downlink assignment from subframe 7, the UE cannot determine whether subframe 7 is an uplink subframe or a downlink subframe. Subsequently, the UE doesn't learn whether subframe 6 is a special subframe or a normal downlink subframe, as shown in FIG. 3.

When subframe 6 is a special subframe, subframe 6 includes three parts, which are respectively DwPTS, GP and UpPTS. Number of Orthogonal Frequency Division Multiplexing (OFDM) symbols used for the PDSCH transmission is obtained as follow. Subtract number of OFDM symbols used for control area transmission of PDCCH from 14 OFDM symbols to obtain an intermedia result, and then subtract OFDM symbol number of GP and UpPTS from the intermedia result. When subframe 6 is a normal downlink subframe, the OFDM symbol number in subframe 6 used for the PDSCH transmission is obtained as follows. Subtract number of OFDM symbols used for the control area transmission of the PDCCH from 14 OFDM symbols.

To enable the UE to explicitly learn number of OFDM symbols within subframe 6 used for PDSCH transmission, and enable the UE and eNB not to confuse the OFDM symbol number used for PDSCH transmission, the UE needs to be informed with a corresponding technical scheme, which is just the technical problem to be solved by the present disclosure currently.

DISCLOSURE OF INVENTION

Technical Problem

An embodiment of the present invention provides a method for processing Physical Downlink Shared Channel (PDSCH) data, so as to enable a UE in a system to explicitly learn number of OFDM symbols used for PDSCH transmission, and to enable the UE and eNB not to confuse number of OFDM symbols used for the PDSCH transmission, in which the system supports to dynamically adjust the Time Division Multiplexing (TDD) uplink and downlink (UL-DL) configurations.

Solution to Problem

An embodiment of the present invention provides a method for processing (PDSCH) data, to be applied in a system which supports to dynamically adjust TDD UL-DL configurations, wherein the method includes:

receiving, by a User Equipment (UE), a System Information Block 1 (SIB1);

obtaining, by the UE, from the SIB1 a TDD UL-DL configuration employed by the UE in current system, wherein the UE doesn't support dynamic service adaption;

determining, by the UE, subframe type of subframe 6, wherein the subframe type of subframe 6 is a special subframe or a normal downlink subframe; and determining, by the UE, number of Orthogonal Frequency Division Multiplexing (OFDM) symbols used for PDSCH transmission within subframe 6, based on the subframe type of subframe 6, and processing the PDSCH data of subframe 6.

Preferably, determining by the UE the subframe type of subframe 6 includes:

determining, by the UE, the subframe type of subframe 6 with indication of specific information, when the TDD UL-DL configuration changes.

Preferably, the specific information includes a Control Format Indicator (CFI) in a Physical Control Format Indicator Channel (PCFICH) and the TDD UL-DL configuration indicated by the SIB1, and the specific information is to indicate the subframe type of subframe 6, when the TDD UL-DL configuration changes.

Preferably, the method further includes:

under the circumstances that bandwidth of a downlink system is larger than 10 Resource Blocks (RBs), and the subframe type of subframe 6 corresponding to the TDD UL-DL configuration indicated by the SIB1 is the special subframe;

when CFI value in the PCFICH of subframe 6 is 1, the subframe type of subframe 6 is indicated as the special subframe, and number of the OFDM symbols used for control area transmission of a Physical Downlink Control Channel (PDCCH) within subframe 6 is 1;

when the CFI value in the PCFICH of subframe 6 is 2, the subframe type of subframe 6 is indicated as the special subframe, and the number of the OFDM symbols used for the control area transmission of the PDCCH within subframe 6 is 2;

when the CFI value in the PCFICH of subframe 6 is 3, the subframe type of subframe 6 is indicated as the normal downlink subframe, and the number of the OFDM symbols used for the control area transmission of the PDCCH within subframe 6 is 1;

when the CFI value in the PCFICH of subframe 6 is 4, the subframe type of subframe 6 is indicated as the normal downlink subframe, and the number of the OFDM symbols used for the control area transmission of the PDCCH within subframe 6 is 2, as shown in Table 2;

under the circumstances that the bandwidth of the downlink system is larger than 10 RBs, and the subframe type of subframe 6 corresponding to the TDD UL-DL configuration indicated by the SIB1 is the normal downlink subframe;

when the CFI value in the PCFICH of subframe 6 is 1, the subframe type of subframe 6 is indicated as the normal downlink subframe, and the number of the OFDM symbols used for the control area transmission of the PDCCH within subframe 6 is 1;

when the CFI value in the PCFICH of subframe 6 is 2, the subframe type of subframe 6 is indicated as the normal downlink subframe, and the number of the OFDM symbols used for the control area transmission of the PDCCH within subframe 6 is 2;

when the CFI value in the PCFICH of subframe 6 is 3, the subframe type of subframe 6 is indicated as the special subframe, and the number of the OFDM symbols used for the control area transmission of the PDCCH is 1;

when the CFI value in the PCFICH of subframe 6 is 4, the subframe type of subframe 6 is indicated as the special subframe, and the number of the OFDM symbols used for the control area transmission of the PDCCH is 2, as shown in Table 2;

TABLE 2

| Subframe type | CFI = 1 | CFI = 2 | CFI = 3 | CFI = 4 |
| --- | --- | --- | --- | --- |
| SIB1 = S | 1, S | 2, S | 1, D | 2, D |
| SIB1 = D | 1, D | 2, D | 1, S | 2, S | wherein in Table 2, S represents the special subframe, D represents the normal downlink subframe;

"SIB1=S" represents that subframe 6 corresponding to the TDD UL-DL configuration indicated by the SIB1 is the special subframe;

"SIB1=D" represents that subframe 6 corresponding to the TDD UL-DL configuration indicated by the SIB1 is the normal downlink subframe;

"n, S" represents that subframe 6 is the special subframe, and the number of the OFDM symbols used for the control area transmission of the PDCCH within subframe 6 is n; and "n, D" represents that subframe 6 is the normal downlink subframe, and the number of the OFDM symbols used for the control area transmission of the PDCCH within subframe 6 is n.

Preferably, the method further includes:

under the circumstances that bandwidth of a downlink system is smaller than or equal to 10 RBs, and the subframe type of subframe 6 corresponding to the TDD UL-DL configuration indicated by the SIB1 is the special subframe;

when CFI value in the PCFICH of subframe 6 is n1, the subframe type of subframe 6 is indicated as the special subframe, and the number of the OFDM symbols used for the control area transmission of the PDCCH within subframe 6 is 2;

when the CFI value in the PCFICH of subframe 6 is n2, the subframe type of subframe 6 is indicated as the normal downlink subframe, and the number of the OFDM symbols used for the control area transmission of the PDCCH within subframe 6 is 2, as shown in Table 3;

under the circumstances that the bandwidth of the downlink system is smaller than or equal to 10 RBs, and the subframe type of subframe 6 corresponding to the TDD UL-DL configuration indicated by the SIB1 is the normal downlink subframe;

when the CFI value in the PCFICH of subframe 6 is n1, the subframe type of subframe 6 is indicated as the normal downlink subframe, and the number of the OFDM symbols used for the control area transmission of the PDCCH within subframe 6 is 2;

when the CFI value in the PCFICH of subframe 6 is n2, the subframe type of subframe 6 is indicated as the special subframe, and the number of the OFDM symbols used for the control area transmission of the PDCCH within subframe 6 is 2, as shown in Table 3;

TABLE 3

| Subframe type | CFI = n1 | CFI = n2 |
|---|---|---|
| SIB1 = S | 2, S | 2, D |
| SIB1 = D | 2, D | 2, S | wherein n1=1, 2, 3 or 4, n2=1, 2, 3 or 4, and n1≠n2;

in Table 3, S represents the special subframe, and D represents the normal downlink subframe;

"SIB1=S" represents that subframe 6 corresponding to the TDD UL-DL configuration indicated by the SIB1 is the special subframe;

"SIB1=D" represents that subframe 6 corresponding to the TDD UL-DL configuration indicated by the SIB1 is the normal downlink subframe;

"2, S" represents that subframe 6 is the special subframe, and the number of the OFDM symbols used for the control area transmission of the PDCCH within subframe 6 is 2; and "2, D" represents that subframe 6 is the normal downlink subframe, and the number of the OFDM symbols used for the control area transmission of the PDCCH within subframe 6 is 2.

Preferably, the method further includes:

under the circumstances that bandwidth of a downlink system is larger than 10 RBs, and the subframe type of subframe 6 corresponding to the TDD UL-DL configuration indicated by the SIB1 is the special subframe;

when CFI value in the PCFICH of subframe 6 is 1, the subframe type of subframe 6 is indicated as the special subframe, and the number of the OFDM symbols used for the control area transmission of the PDCCH within subframe 6 is 1;

when the CFI value in the PCFICH of subframe 6 is 2, the subframe type of subframe 6 is indicated as the special subframe, and the number of the OFDM symbols used for the control area transmission of the PDCCH within subframe 6 is 2;

when the CFI value in the PCFICH of subframe 6 is 3, the subframe type of subframe 6 is indicated as the normal downlink subframe, and the number of the OFDM symbols used for the control area transmission of the PDCCH within subframe 6 is fixed, which is 1 or 2;

the CFI value in the PCFICH of subframe 6 being 4, which represents reserved, as shown in Table 4;

under the circumstances that the bandwidth of the downlink system is larger than 10 RBs, and the subframe type of subframe 6 corresponding to the TDD UL-DL configuration indicated by the SIB1 is the normal downlink subframe;

when the CFI value in the PCFICH of subframe 6 is 1, the subframe type of subframe 6 is indicated as the normal downlink subframe, and the number of the OFDM symbols used for the control area transmission of the PDCCH within subframe 6 is 1;

when the CFI value in the PCFICH of subframe 6 is 2, the subframe type of subframe 6 is indicated as the normal downlink subframe, and the number of the OFDM symbols used for the control area transmission of the PDCCH within subframe 6 is 2;

when the CFI value in the PCFICH of subframe 6 is 3, the subframe type of subframe 6 is indicated as the special subframe, and the number of the OFDM symbols used for the control area transmission of the PDCCH within subframe 6 is fixed, which is 1 or 2;

wherein the CFI value in the PCFICH of subframe 6 is 4, which represents reserved, as shown in Table 4;

TABLE 4

| Subframe type | CFI = 1 | CFI = 2 | CFI = 3 | CFI = 4 |
|---|---|---|---|---|
| SIB1 = S | 1, S | 2, S | D, which is applied when the number of OFDM symbols used for the PDCCH is fixed, such as 1 or 2 | reserved |
| SIB1 = D | 1, D | 2, D | S, which is applied when the number of OFDM symbols used for the PDCCH is fixed, such as 1 or 2 | reserved | wherein in Table 4, S represents the special subframe, D represents the normal downlink subframe;

"SIB1=S" represents that subframe 6 corresponding to the TDD UL-DL configuration indicated by the SIB1 is the special subframe;

"SIB1=D" represents that subframe 6 corresponding to the TDD UL-DL configuration indicated by the SIB1 is the normal downlink subframe;

"n, S" represents that subframe 6 is the special subframe, and the number of the OFDM symbols used for the control area transmission of the PDCCH within subframe 6 is n; and "n, D" represents that subframe 6 is the normal downlink subframe, and the number of the OFDM symbols used for the control area transmission of the PDCCH within subframe 6 is n.

Preferably, the specific information includes a padding bit or a new domain in a Physical Downlink Control Channel (PDCCH), and the specific information is to indicate the subframe type of subframe 6, when the TDD UL-DL configuration changes.

Preferably, determining by the UE the subframe type of subframe 6 includes:

determining, by the UE, the subframe type of subframe 6, by using 1 padding bit or the new domain of 1 bit in the PDCCH;

when 1 padding bit or the new domain of 1 bit in the PDCCH indicates subframe 6 is the special subframe, and the UE processes the PDSCH data of subframe 6, treating, by the UE, subframe 6 as the special subframe;

determining the number of the OFDM symbols used for the PDSCH transmission within subframe 6 includes:

subtracting the number of the OFDM symbols used for the control area transmission of the PDCCH from 14 OFDM symbols to obtain an intermediate result; and subtracting number of the OFDM symbols of Guard Period (GP) and Uplink Pilot Time Slot (UpPTS) from the intermediate result;

when 1 padding bit or the new domain of 1 bit in the PDCCH indicates that subframe 6 is the normal downlink subframe, and the UE processes the PDSCH data of subframe 6, treating, by the UE, subframe 6 as the normal downlink subframe, and determining the number of the OFDM symbols used for the PDSCH transmission within subframe 6 includes:

subtracting a number of OFDM symbols used for the control area transmission of the PDCCH from 14 OFDM symbols.

Preferably, the method further includes:

indicating the subframe type of subframe 6 with Radio Resource Control (RRC) signaling, when the TDD UL-DL configuration changes;

when the RRC signaling indicates that subframe 6 is the special subframe, and the UE processes the PDSCH data of subframe 6, treating, by the UE, subframe 6 as the special subframe, and determining the number of the OFDM symbols used for the PDSCH transmission within subframe 6 includes:

subtracting a number of OFDM symbols used for the control area transmission of the PDCCH from 14 OFDM symbols to obtain an intermediate result; and subtracting a number of the OFDM symbols of GP and UpPTS from the intermediate result;

when the RRC signaling indicates that subframe 6 is the normal downlink subframe, and the UE processes the PDSCH data of subframe 6, treating, by the UE, subframe 6 as the common downlink subframe, and determining the number of the OFDM symbols used for the PDSCH transmission within subframe 6 includes:

subtracting the number of OFDM symbols used for the control area transmission of the PDCCH from 14 OFDM symbols.

Preferably, the method further includes:

providing, by an evolved Node B (eNB), a range set about dynamic change of the TDD UL-DL configuration, when initiating the dynamic change of the TDD UL-DL configuration with Radio Resource Control (RRC) signaling;

when each of TDD UL-DL configurations in the set includes 2 switching points, and the UE processes the PDSCH data of subframe 6, treating, by the UE, subframe 6 as the special subframe, and determining the number of OFDM symbols used for the PDSCH transmission within subframe 6 includes:

subtracting the number of OFDM symbols used for the control area transmission of the PDCCH from 14 OFDM symbols to obtain an intermediate result; and subtracting the number of the OFDM symbols of Guard Period (GP) and Uplink Pilot Time Slot (UpPTS) from the intermediate result;

when each of TDD UL-DL configurations in the set includes 1 switching point, and the UE processes the PDSCH data of subframe 6, treating, by the UE, subframe 6 as the normal downlink subframe, and determining the number of the OFDM symbols used for the PDSCH transmission within subframe 6 includes:

subtracting the number of the OFDM symbols used for the control area transmission of the PDCCH from 14 OFDM symbols;

when the TDD UL-DL configuration in the set includes 2 switching points or 1 switching point, and the UE processes the PDSCH data of subframe 6, treating, by the UE, subframe 6 as the special subframe, and determining the number of the OFDM symbols used for the PDSCH transmission within subframe 6 includes:

subtracting the number of the OFDM symbols used for the control area transmission of the PDCCH from 14 OFDM symbols to obtain an intermediate result; and subtracting the number of the OFDM symbols of the GP and UpPTS from the intermediate result.

Preferably, determining by the UE the subframe type of subframe 6 with indication of specific information, when the TDD UL-DL configuration changes includes:

indicating the subframe type of subframe 6 with Media Access Control (MAC) signaling, when the TDD UL-DL configuration changes;

when the MAC signaling indicates that subframe 6 is the special subframe, and the UE processes the PDSCH data of subframe 6, treating, by the UE, subframe 6 as the special subframe, and determining the number of the OFDM symbols used for the PDSCH transmission within subframe 6 includes:

subtracting a number of OFDM symbols used for the control area transmission of the PDCCH from 14 OFDM symbols to obtain an intermediate result; and subtracting a number of the OFDM symbols of GP and UpPTS from the intermediate result;

when the MAC signaling indicates that subframe 6 is the normal downlink subframe, and the UE processes the PDSCH data of subframe 6, treating, by the UE, subframe 6 as the common downlink subframe, and determining the number of the OFDM symbols used for the PDSCH transmission within subframe 6 includes:

subtracting the number of the OFDM symbols used for the control area transmission of the PDCCH from 14 OFDM symbols.

Preferably, the method further includes:

Assumption in advance that subframe 6 is always a special subframe, when the TDD UL-DL configuration changes, and determining the number of the OFDM symbols used for the PDSCH transmission within subframe 6 includes:

subtracting a number of the OFDM symbols used for the control area transmission of the PDCCH from 14 OFDM symbols to obtain an intermediate result; and subtracting a number of the OFDM symbols of Guard Period (GP) and Uplink Pilot Time Slot (UpPTS) from the intermediate result.

Advantageous Effects of Invention

By adopting the technical scheme provided by embodiments of the present invention, subframe type of subframe 6 may be indicated with specific information, when the TDD UL-DL configurations change. Or, suppose subframe type of subframe 6 used for the PDSCH transmission is always the special subframe. Subsequently, the UE may be ensured to explicitly learn number of OFDM symbols within subframe 6 used for the PDSCH transmission. The UE and eNB may be enabled not to confuse number of OFDM symbols used for the PDSCH transmission. Besides, for a backward compatible UE, such as, a UE supporting LTE version 8, or version 9 or version 10, when the eNB schedules the UE to perform the PDSCH transmission at subframe 6, it may be guaranteed that the actual subframe type about the subframe is consistent with subframe type of subframe 6 in the TDD UL-DL configurations indicated by SIB1.

MODE FOR THE INVENTION

To make objectives, technical solutions and advantages of the present disclosure more clear, detailed descriptions about the present disclosure are provided in the following, accompanying with attached figures and embodiments.

For the TDD system, suppose the TDD UL-DL configurations are adjusted dynamically, according to UL-DL service ratio change. For example, the TDD UL-DL configurations are dynamically adjusted with the PDCCH.

Figure 4:
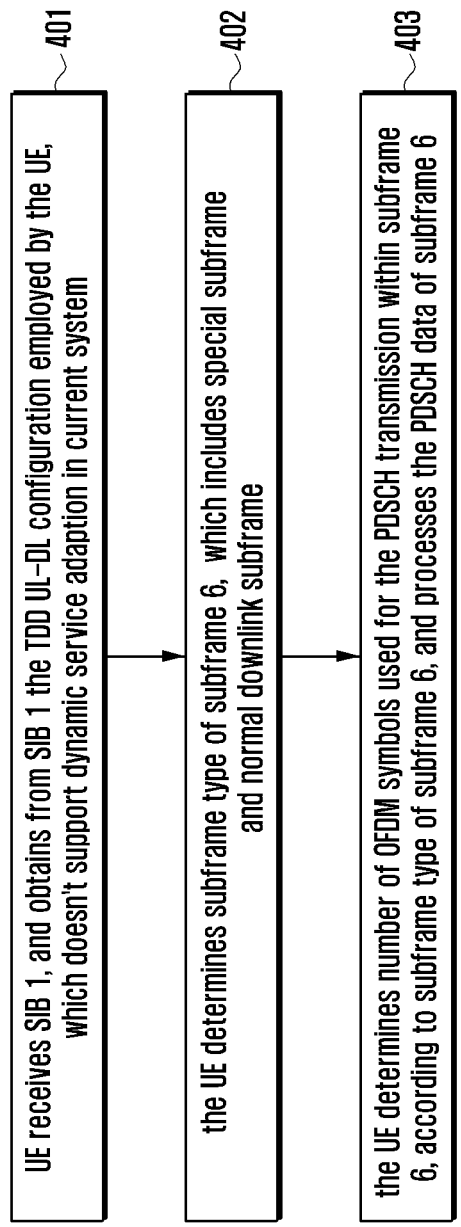
FIG. 4 is a flowchart illustrating a method for processing PDSCH data, in accordance with an embodiment of the present invention.

An embodiment of the present invention provides a method for processing PDSCH data, to be applied in a system, which supports to dynamically adjust the TDD UL-DL configurations. FIG. 4 is a basic flowchart illustrating a method for processing the PDSCH data, in accordance with an embodiment of the present invention. As shown in FIG. 4, the flow may include the following blocks.

Block 401: a UE receives a SIB1, to obtain TDD UL-DL configurations employed by a UE in current system from the SIB1, in which the UE doesn't support dynamical service adaption.

Here, the UE, which doesn't support the dynamical service adaption, refers to a UE which doesn't support to dynamically adjust the TDD UL-DL configurations. The TDD UL-DL configurations employed by these UEs are in the prior art, which may be indicated with SIB1. In the following, the TDD UL-DL configurations are referred to as the TDD UL-DL configurations indicated by SIB1.

Block 402: the UE determines subframe type for subframe 6.

There are two subframe types for subframe 6, that is, special subframe and normal downlink subframe.

Block 403: the UE may determine number of OFDM symbols used for the PDSCH transmission within subframe 6, based on subframe type of subframe 6, and then process the PDSCH data within subframe 6.

Regarding above block 402, embodiments of the present invention provide two preferred methods to determine subframe type of subframe 6, which will be respectively described in the following.

The first method is to determine subframe type of subframe 6 with indication in specific information, when the TDD UL-DL configurations change. Specifically speaking, there are 6 preferred modes.

Mode 1 is to determine subframe type of subframe 6, when the TDD UL-DL configurations change, according to a combination of Control Format Indicator (CFI) in a Physical Control Format Indicator Channel (PCFICH) and the TDD UL-DL configurations indicated by SIB1. There are several scenarios in mode 1, which are listed in the following.

Scenario 1:
under the circumstances that bandwidth of a downlink system is larger than 10 Resource Blocks (RBs), and subframe type of subframe 6 is a special subframe, in which subframe 6 corresponds to the TDD UL-DL configurations indicated by SIB1, when CFI value in the PCFICH of subframe 6 is 1, it indicates that subframe type of subframe 6 is a special subframe, and number of OFDM symbols used for control area transmission of the PDCCH within subframe 6 is 1.

When the CFI value in the PCFICH of subframe 6 is 2, it indicates that subframe type of subframe 6 is a special subframe, and number of OFDM symbols used for control area transmission of the PDCCH within subframe 6 is 2.

When the CFI value in the PCFICH of subframe 6 is 3, it indicates that subframe type of subframe 6 is a normal downlink subframe, and number of OFDM symbols used for control area transmission of the PDCCH within subframe 6 is 1.

When the CFI value in the PCFICH of subframe 6 is 4, it indicates that subframe type of subframe 6 is a normal uplink subframe, and number of OFDM symbols used for control area transmission of the PDCCH within subframe 6 is 2.

Figure 1:
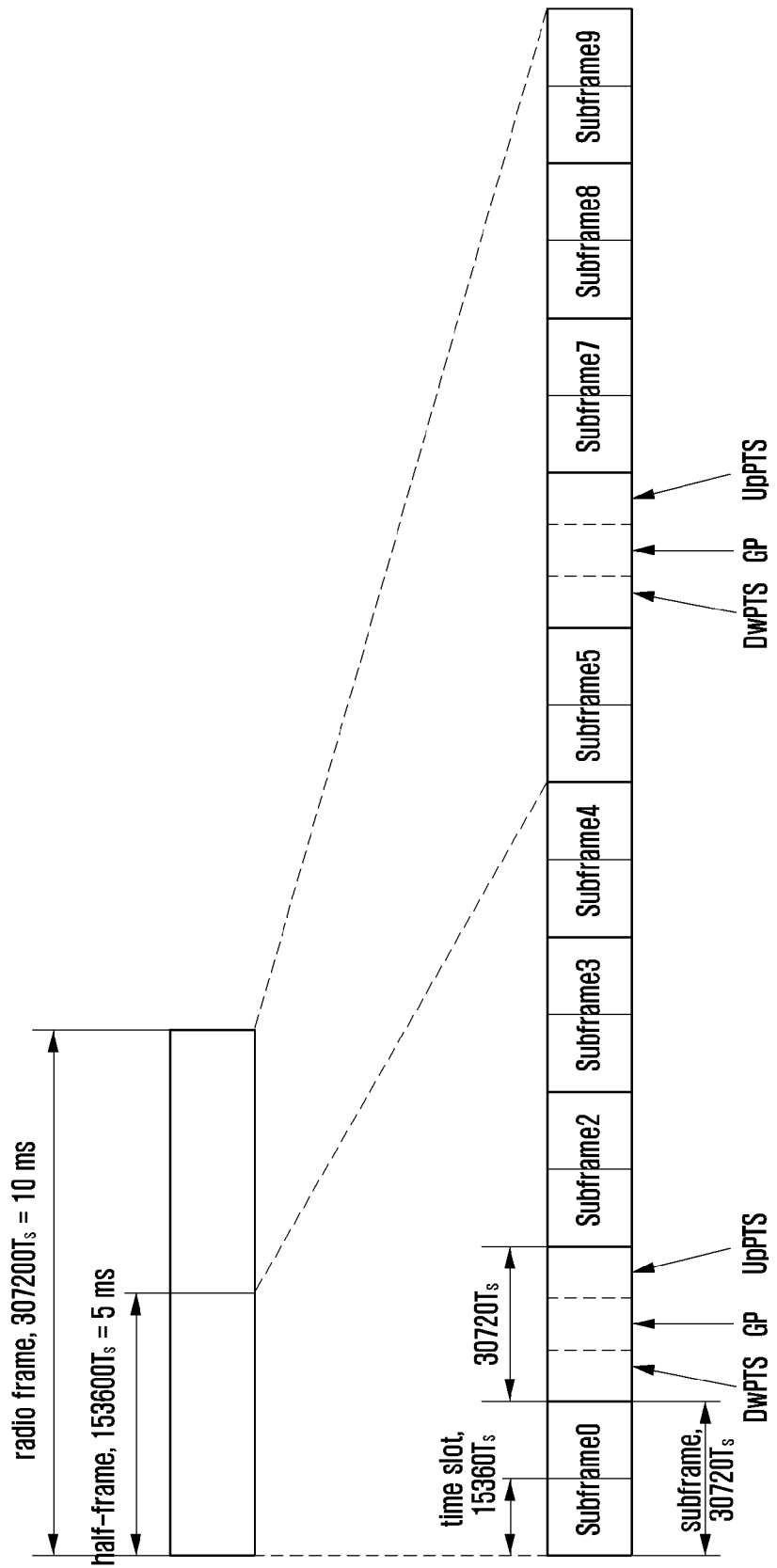
FIG. 1 is a schematic diagram illustrating frame structure about existing LTE TDD.
Figure 2:
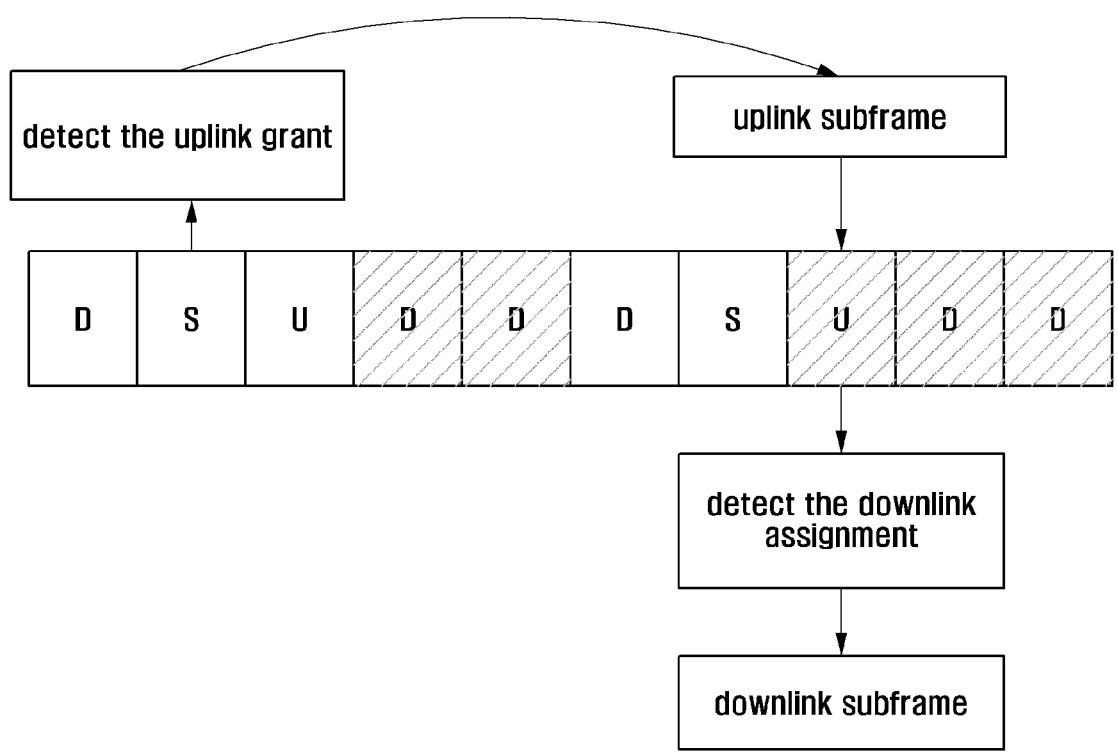
FIG. 2 is a schematic diagram illustrating direction change about a flexible subframe, when TDD UL-DL configuration changes dynamically.
Figure 3:
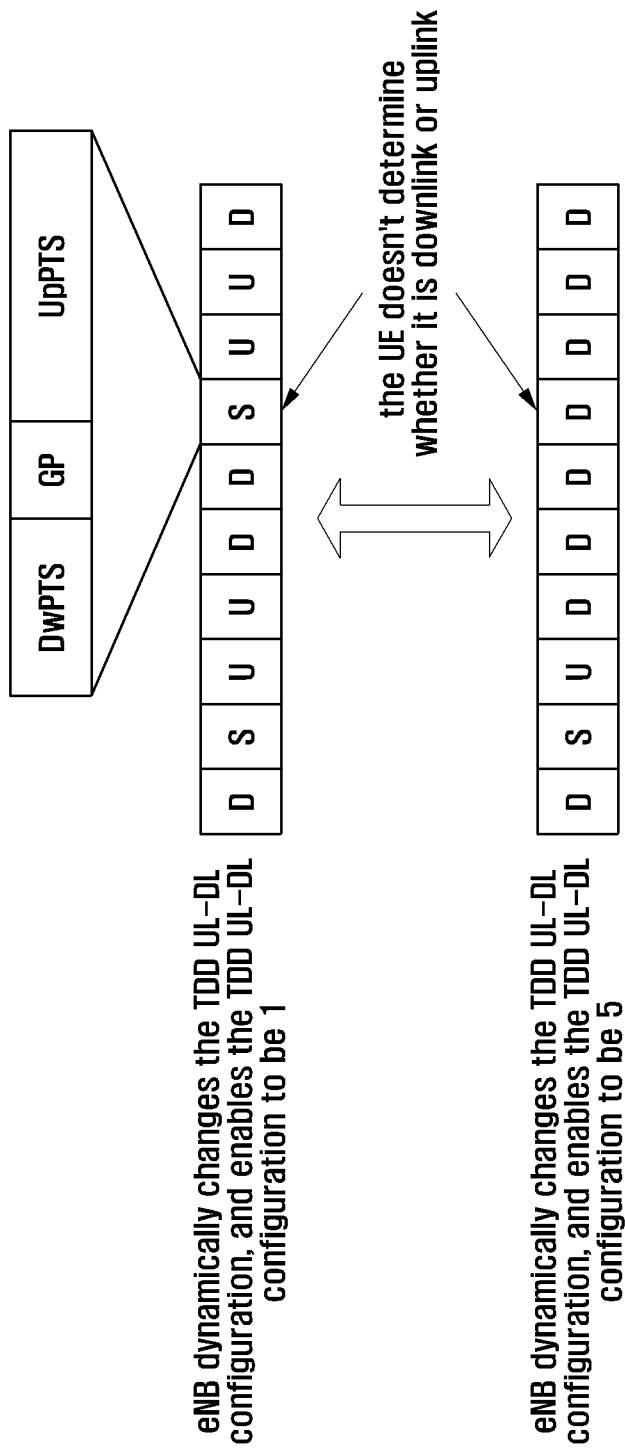
FIG. 3 is a schematic diagram illustrating subframe type change about subframe 6, when the TDD UL-DL configurations change dynamically.

In this case, relationships among CFI value, subframe type of subframe 6 indicated by SIB1, subframe type of subframe 6 determined finally and number of OFDM symbols used for control area transmission of the PDCCH within subframe 6 are shown in FIG. 2, Table 5 is a schematic table illustrating how the CFI to indicate subframe type of subframe 6.

TABLE 5

| Subframe type | CFI values = 1 | CFI values = 2 | CFI values = 3 | CFI values = 4 |
| --- | --- | --- | --- | --- |
| SIB1 = S | 1, S | 2, S | 1, D | 2, D |
| SIB1 = D | 1, D | 2, D | 1, S | 2, S |

In table 5, S represents a special subframe, and D represents a normal downlink subframe.

SIB1=S or D, refers to as follows. In block 401, the UE reads from system information subframe 6 is a special subframe (S) or a normal downlink subframe (D), in which subframe 6 corresponds to the TDD UL-DL configurations (that is, the TDD UL-DL configurations indicated by SIB1) employed by the UE, which doesn't support dynamical service adaptation in current system. For example, when the TDD UL-DL configurations indicated by SIB is TDD UL-DL configuration 1, subframe 6 corresponding to TDD UL-DL configuration 1 is a special subframe (S), which may be denoted by SIB1=S in Table 5. When the TDD UL-DL configuration indicated by SIB1 is TDD UL-DL configuration 3, subframe 6 corresponding to TDD UL-DL configuration 3 is a normal downlink subframe (D), which is denoted by SIB1=D in Table 5.

Besides, "n, S" in lines 2 and 3 of Table 5 refer to that, subframe 6 is a special subframe, and number of OFDM symbols used for the control area transmission of the PDCCH is n. "n, D" refer to that, subframe 6 is a normal downlink subframe, and number of OFDM symbols used for the control area transmission of the PDCCH is n.

It should be noted that, based on current LTE TDD specifications, when bandwidth of a downlink system is larger than 10 RBs, number of OFDM symbols used for the control area transmission of the PDCCH within subframe 6 may be 1 or 2. When the bandwidth of the downlink system is smaller than or equal to 10 RBs, the number of OFDM symbols used for the control area transmission of the PDCCH within subframe 6 is 2. Therefore, in the embodiment of the present invention, whether bandwidth of a downlink system is larger than 10 RBs is taken as a judgment condition.

In a first embodiment, when the TDD UL-DL configuration indicated by SIB1 is TDD UL-DL configuration 2, subframes 3, 4, 7, 8 and 9 are flexible subframes, and subframe 6 is a special subframe. When the actual TDD UL-DL configuration turns into TDD UL-DL configuration 5 dynamically, subframe 6 actually becomes a normal downlink subframe at this time. When number of OFDM symbols used for the control area transmission of the PDCCH within subframe 6 is 2, the CFI information transmitted at this time is 4. After receiving the CFI information, the UE may learn that subframe 6 actually becomes a normal downlink subframe, and number of OFDM symbols used for the PDSCH transmission may be obtained as follows. Subtract number 2 of OFDM symbols used for the control area transmission of the PDCCH from 14 OFDM symbols. And then, number of OFDM symbols used for the PDSCH transmission may be determined finally, which is 12.

Scenario 2:

under the circumstances that bandwidth of a downlink system is larger than 10 RBs, and subframe type of subframe 6 is a normal downlink subframe, in which subframe 6 corresponds to the TDD UL-DL configuration indicated by SIB1, when CFI value in the PCFICH of subframe 6 is 1, it indicates that the subframe type of subframe 6 is a normal downlink subframe, and number of OFDM symbols used for the control area transmission of the PDCCH within subframe 6 is 1.

When the CFI value in the PCFICH of subframe 6 is 2, it indicates that the subframe type of subframe 6 is a normal downlink subframe, and number of OFDM symbols used for the control area transmission of the PDCCH within subframe 6 is 2.

When the CFI value in the PCFICH of subframe 6 is 3, it indicates that the subframe type of subframe 6 is a special subframe, and number of OFDM symbols used for the control area transmission of the PDCCH within subframe 6 is 1.

When the CFI value in the PCFICH of subframe 6 is 4, it indicates that the subframe type of subframe 6 is a special subframe, and number of OFDM symbols used for the control area transmission of the PDCCH within subframe 6 is 2, which is shown in Table 5.

Scenario 3:

under the circumstances that bandwidth of the downlink system is smaller than or equal to 10 RBs, and subframe type of subframe 6 is a special subframe, in which subframe 6 corresponds to the TDD UL-DL configuration indicated by SIB1, when the CFI value in the PCFICH of subframe 6 is n1, it indicates that subframe type of subframe 6 is a special subframe, and number of OFDM symbols used for the control area transmission of the PDCCH within subframe 6 is 2.

When the CFI value in the PCFICH of subframe 6 is n2, it indicates that subframe type of subframe 6 is a normal downlink subframe, and number of OFDM symbols used for the control area transmission of the PDCCH within subframe 6 is 2, which are shown in Table 6.

Table 6 is a schematic table illustrating how the CFI to indicate subframe type of subframe 6

TABLE 6

| Subframe type | CFI = n1 | CFI = n2 |
| --- | --- | --- |
| SIB1 = S | 2, S | 2, D |
| SIB1 = D | 2, D | 2, S |

In Table 6, n1=1, 2, 3 or 4, n2=1, 2, 3 or 4, and n1≠n2.

Besides, physical meaning of each symbol in Table 6 is similar to that in Table 5, which are not repeated here.

Scenario 4:

under the circumstances that bandwidth of a downlink system is smaller than or equal to 10 RBs, and subframe type of subframe 6 is a normal downlink subframe, in which subframe 6 corresponds to the TDD UL-DL configuration indicated by SIB1, when the CFI value in the PCFICH in subframe 6 is n1, it indicates that subframe type of subframe 6 is a normal downlink subframe, and number of OFDM symbols used for the control area transmission of the PDCCH within subframe 6 is 2.

When the CFI value in the PCFICH in subframe 6 is n2, it indicates that subframe type of subframe 6 is a special subframe, and number of OFDM symbols used for the control area transmission of the PDCCH within subframe 6 is 2, which are shown in Table 6.

In Table 6, n1=1, 2, 3 or 4, n2=1, 2, 3 or 4, and n1≠n2.

In a second embodiment, suppose the TDD UL-DL configuration indicated by SIB1 is TDD UL-DL configuration 5, subframes 3, 4, 7, 8 and 9 are flexible subframes, and subframe 6 is a normal downlink subframe. When the actual TDD UL-DL configuration turns into TDD UL-DL configuration 1 dynamically, subframe 6 actually becomes a special subframe at this time. When number of OFDM symbols used for the control area transmission of the PDCCH within subframe 6 is 2, the CFI information transmitted at this time is 4. After receiving the CFI information, the UE may learn that subframe 6 actually becomes a special subframe, and number of OFDM symbols used for the PDSCH transmission may be obtained as follows. Subtract number 2 of OFDM symbols used for the control area transmission of the PDCCH from 14 OFDM symbols to obtain an intermediate result, and then subtract number of OFDM symbols of GP and UpPTS from the intermediate result, to obtain a final result. Suppose number of OFDM symbols of GP and UpPTS is 5, 14−2−5=7, and then it may determine that there are 7 OFDM symbols used for the PDSCH transmission.

Mode 2 is similar to mode 1. In mode 2, subframe type of subframe 6 may be determined, when the TDD UL-DL configuration changes, according to a combination of CFI in the PCFICH and the TDD UL-DL configuration indicated by SIB1. Mode 2 may be divided into several scenarios listed in the following.

Scenario 1:

under the circumstances that bandwidth of a downlink system is larger than 10 RBs, and subframe type of subframe 6 is a special subframe, in which subframe 6 corresponds to the TDD UL-DL configuration indicated by SIB1, when the CFI value in the PCFICH of subframe 6 is 1, it indicates that subframe type of subframe 6 is a special subframe, and number of OFDM symbols used for the control area transmission of the PDCCH within subframe 6 is 1.

When the CFI value in the PCFICH of subframe 6 is 2, it indicates that subframe type of subframe 6 is a special subframe, and number of OFDM symbols used for the control area transmission of the PDCCH within subframe 6 is 2.

When the CFI value in the PCFICH of subframe 6 is 3, it indicates that subframe type of subframe 6 is a normal downlink subframe, and number of OFDM symbols used for the control area transmission of the PDCCH within subframe 6 is 1 or 2.

The CFI value in the PCFICH of subframe 6 is 4, which indicates reserved as shown in Table 7.

Table 7 is a schematic table illustrating how the CFI to indicate subframe type of subframe 6

TABLE 7

| Subframe type | CFI = 1 | CFI = 2 | CFI = 3 | CFI = 4 |
|---|---|---|---|---|
| SIB1 = S | 1, S | 2, S | D, which is applied when the number of OFDM symbols used for the PDCCH is fixed, such as 1 or 2 | reserved |
| SIB1 = D | 1, D | 2, D | S, which is applied when the number of OFDM symbols used for the PDCCH is fixed, such as 1 or 2 | reserved |

Physical meaning of each symbol in Table 7 is similar to that in Table 5, which are not repeated here.

In a third embodiment, suppose the TDD UL-DL configuration indicated by SIB1 is TDD UL-DL configuration 2, subframes 3, 4, 7, 8 and 9 are flexible subframes, and subframe 6 is a special subframe. When the actual TDD UL-DL configuration dynamically turns into TDD UL-DL configuration 5, subframe 6 actually becomes a normal downlink subframe at this time. When number of OFDM symbols used for the control area transmission of the PDCCH within subframe 6 is 1, the CFI information transmitted at this time is 3. After receiving the CFI information, the UE may learn that subframe 6 actually becomes a normal downlink subframe, and number of OFDM symbols used for the PDSCH transmission may be obtained as follows. Subtract a number of OFDM symbols of control area from 14 OFDM symbols. Suppose the number of OFDM symbols of the control area is 2, number of OFDM symbols used for the PDSCH transmission finally determined may be, 14−2=12.

Scenario 2:

under the circumstances that bandwidth of a downlink system is larger than 10 RBs, and subframe type of subframe 6 is a normal downlink subframe, in which subframe 6 corresponding to the TDD UL-DL configuration indicated by SIB1, when the CFI value in the PCFICH of subframe 6 is 1, it indicates that the subframe type of subframe 6 is a normal downlink subframe, and number of OFDM symbols used for the control area transmission of the PDCCH within subframe 6 is 1.

When the CFI value in the PCFICH of subframe 6 is 2, it indicates that the subframe type of subframe 6 is a normal downlink subframe, and number of OFDM symbols used for the control area transmission of the PDCCH within subframe 6 is 2.

When the CFI value in the PCFICH of subframe 6 is 3, it indicates that the subframe type of subframe 6 is a special subframe, and the number of OFDM symbols used for the control area transmission of the PDCCH is 1 or 2.

The CFI value in the PCFICH of subframe 6 is 4, which indicates reserved as shown in Table 7.

In a fourth embodiment, suppose the TDD UL-DL configuration indicated by SIB1 is TDD UL-DL configuration 5, subframes 3, 4, 7, 8 and 9 are flexible subframes, subframe 6 is a normal downlink subframe. When the actual TDD UL-DL configuration dynamically turns into TDD UL-DL configuration 1, subframe 6 actually becomes a special subframe at this time. When number of OFDM symbols used for the control area transmission of the PDCCH within subframe 6 is 1, the CFI information transmitted is 3. After receiving the CFI information, the UE may learn that subframe 6 actually becomes a special subframe, and number of OFDM symbols used for the PDSCH transmission may be obtained as follows. Subtract a number of OFDM symbols of the control area from 14 OFDM symbols to obtain an intermediate result. Suppose the number of OFDM symbols of the control area is 2, subtract number of OFDM symbols of GP and UpPTS from the intermedia result. Suppose number of OFDM symbols of GP and UpPTS is 5, number of OFDM symbols used for the PDSCH transmission finally determined is, 14−2−5=7.

In mode 3, the eNB may indicate subframe type of subframe 6 with padding bits or new domains of PDCCH, when the TDD UL-DL configuration changes. The UE may determine the subframe type of subframe 6, by using the padding bits or new domains of the PDCCH. For example, the UE may determine the subframe type of subframe 6, by using 1 padding bits or new domain of 1 bit in the PDCCH. When subframe 6 is a special subframe and the UE processes the PDSCH data of subframe 6, UE may treat subframe 6 as a special subframe. That is, number of OFDM symbols used for the PDSCH transmission may be as follows. Subtract a number of OFDM symbols of control area from 14 OFDM symbols to obtain an intermediate result. And then, subtract number of OFDM symbols of GP and UpPTS from the intermediate result. When subframe 6 is a normal downlink subframe and the UE processes the PDSCH data of subframe 6, the UE may treat subframe 6 as a normal downlink subframe. That is, the number of OFDM symbols used for the PDSCH transmission may be obtained as follows. Subtract number of OFDM symbols of the control area from 14 OFDM symbols.

In mode 4, subframe type of subframe 6 may be indicated with Radio Resource Control (RRC) signaling, when the TDD UL-DL configuration changes.

In mode 4, the eNB may send subframe type of subframe 6 to the UE with high level signaling. That is, the eNB may directly send the subframe type of subframe 6 to each UE with the RRC signaling. When the RRC signaling indicates that subframe 6 is a special subframe and the UE processes the PDSCH data of subframe 6, the UE may treat subframe 6 as a special subframe. That is, number of OFDM symbols used for the PDSCH transmission may be obtained as follows. Subtract a number of OFDM symbols of the control area from 14 OFDM symbols to obtain an intermediate result. And then, subtract number of OFDM symbols of the GP and UpPTS from the intermediate result. When the RRC signaling indicates that subframe 6 is a normal downlink subframe and the UE processes the PDSCH data of subframe 6, the UE may treat subframe 6 as a normal downlink subframe, that is, number of OFDM symbols used for the PDSCH transmission may be obtained as follows. Subtract number of OFDM numbers of the control area from 14 OFDM symbols.

In mode 5, subframe type of subframe 6 may also be indicated with RRC signaling, when the TDD UL-DL configuration changes.

In mode 5, the eNB may indicate whether subframe 6 is a special subframe or a normal downlink subframe with the high level signaling, simultaneously when initiating the dynamic change of the TDD UL-DL configuration with the high level signaling.

Alternatively, another optional mode is as follows. The eNB may provide range set about dynamic change of the TDD UL-DL configuration, when initiating the dynamic change of TDD UL-DL configuration with the high level signaling.

When each TDD UL-DL configuration in the set includes 2 switching points, that is, subframe 6 in the TDD UL-DL configuration of the set is a special subframe. For example, under the circumstances that the range set about the dynamic change of the TDD UL-DL configuration is {TDD UL-DL configurations 0, 1, 2, 6}, when processing the PDSCH data of subframe 6, the UE may treat subframe 6 as a special subframe, that is, number of OFDM symbols used for the PDSCH transmission may be obtained as follows. Subtract a number of OFDM symbols of the control area from 14 OFDM symbols to obtain an intermediate result. And then, subtract the number of OFDM symbols of GP and UpPTS from the intermediate result.

When each of TDD UL-DL configurations in the set includes 1 switching point, that is, subframe 6 of the TDD UL-DL configuration in the set is a normal downlink subframe. For example, under the circumstances that the range set about the dynamic change of the TDD UL-DL configuration is {TDD UL-DL configurations 3, 4, 5}, when processing the PDSCH data of subframe 6, the UE may treat subframe 6 as a normal downlink subframe. That is, number of OFDM symbols used for the PDSCH transmission may be obtained as follows. Subtract a number of OFDM symbols of the control area from 14 OFDM symbols.

When some TDD UL-DL configurations in the set include 2 switching points, while some other TDD UL-DL configurations in the set include 1 switching point, that is, subframe 6 about the TDD UL-DL configuration may be a special subframe or a normal downlink subframe. For example, under the circumstances that the range set about the dynamic change of the TDD UL-DL configuration is {TDD UL-DL configurations 0, 1, 2, 3, 4, 5, 6}, when processing the PDSCH data of subframe 6, the UE may treat subframe 6 as a special subframe, that is, number of OFDM symbols used for the PDSCH transmission may be obtained as follows. Subtract a number of OFDM symbols of control area from 14 OFDM symbols to obtain an intermediate result. And then, subtract number of OFDM symbols of GP and UpPTS from the intermediate result.

In mode 6, the subframe type of subframe 6 may be indicated with Media Access Control (MAC) signaling, when the TDD UL-DL configuration changes.

In mode 6, the eNB may send the subframe type of subframe 6 to the UE with the MAC signaling. That is, the eNB may directly send the subframe type of subframe 6 to each UE with the MAC signaling. When the MAC signaling indicates that subframe 6 is a special subframe and the UE processes the PDSCH data of subframe 6, the UE may treat subframe 6 as a special subframe. That is, number of OFDM symbols used for the PDSCH transmission may be obtained as follows. Subtract a number of OFDM symbols of control area from 14 OFDM symbols to obtain an intermedia result. And then, subtract the number of OFDM symbols of GP and UpPTS from the intermediate result. When the MAC signaling indicates that subframe 6 is a normal downlink subframe and the UE processes the PDSCH data of subframe 6, the UE may treat subframe 6 as a common downlink subframe. That is, number of OFDM symbols used for the PDSCH transmission may be obtained as follows. Subtract the number of OFDM symbols of the control area from 14 OFDM symbols.

In a second method, when a system supports to dynamically adjust the TDD UL-DL configurations, assumption in advance (for example, assumption with relevant specification and standard) that subframe 6 is always a special subframe. Subsequently, number of OFDM symbols used for the PDSCH transmission within subframe 6 may be always dealt with in accordance with the special subframe.

Figure 5:
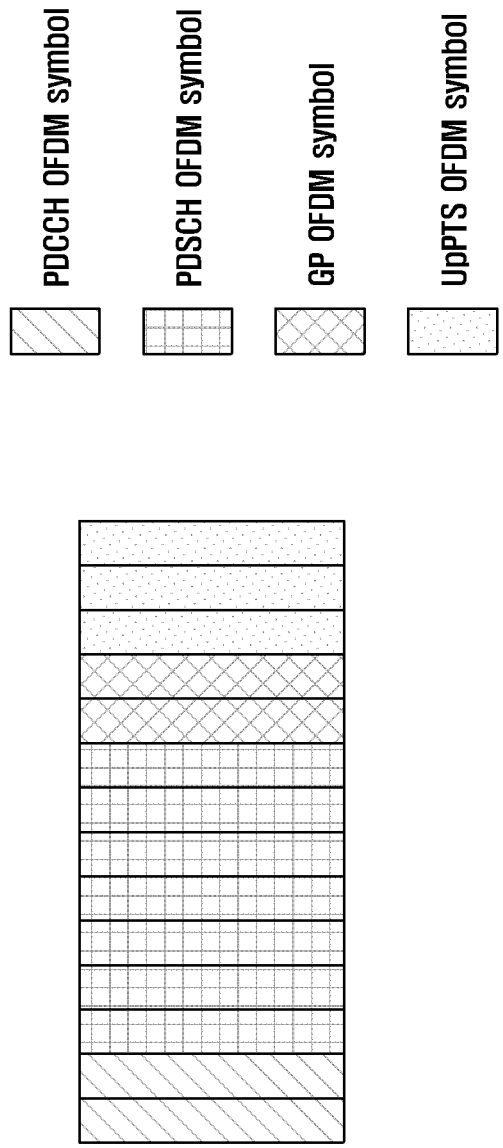
FIG. 5 is a schematic diagram illustrating number of OFDM symbols used for the PDSCH transmission within subframe 6, when the TDD UL-DL configurations change dynamically, in the first scene of the second method of the present disclosure.

Scenario 1:

When subframe 6 is a special subframe according to the actual TDD UL-DL configuration, after receiving the PDSCH, the UE may process the PDSCH taking into consideration that subframe 6 is a special subframe. That is, number of OFDM symbols used for the PDSCH transmission may be obtained as follows. Subtract number of OFDM symbols used for the control area transmission of the PDCCH from 14 OFDM symbols to obtain an intermediate result. And then, subtract the number of OFDM symbols of GP and UpPTS from the intermediate result, as shown in FIG. 5.

In a fifth embodiment, suppose the TDD UL-DL configuration indicated by SIB1 is TDD UL-DL configuration 2, subframes 3, 4, 7, 8 and 9 are flexible subframes, and subframe 6 is a special subframe. When the actual TDD UL-DL configuration dynamically turns into TDD UL-DL configuration 5, subframe 6 becomes a normal downlink subframe at this time. When calculating number of OFDM symbols used for the PDSCH transmission, the UE may consider subframe 6 is a special subframe. Thus, number of OFDM symbols used for the PDSCH transmission may be obtained as follows. Subtract number of OFDM symbols occupied by control area of the PDCCH indicated by the CFI from 14 OFDM symbols to obtain an intermediate result. And then, subtract number of OFDM symbols of GP and UpPTS from the intermediate result. Suppose number of OFDM symbols occupied by the control area of the PDCCH indicated by CFI is 2, suppose number of OFDM symbols of GP and UpPTS is 5, the number of OFDM symbols used for the PDSCH transmission finally determined is, 14−2−5=7.

Figure 6:
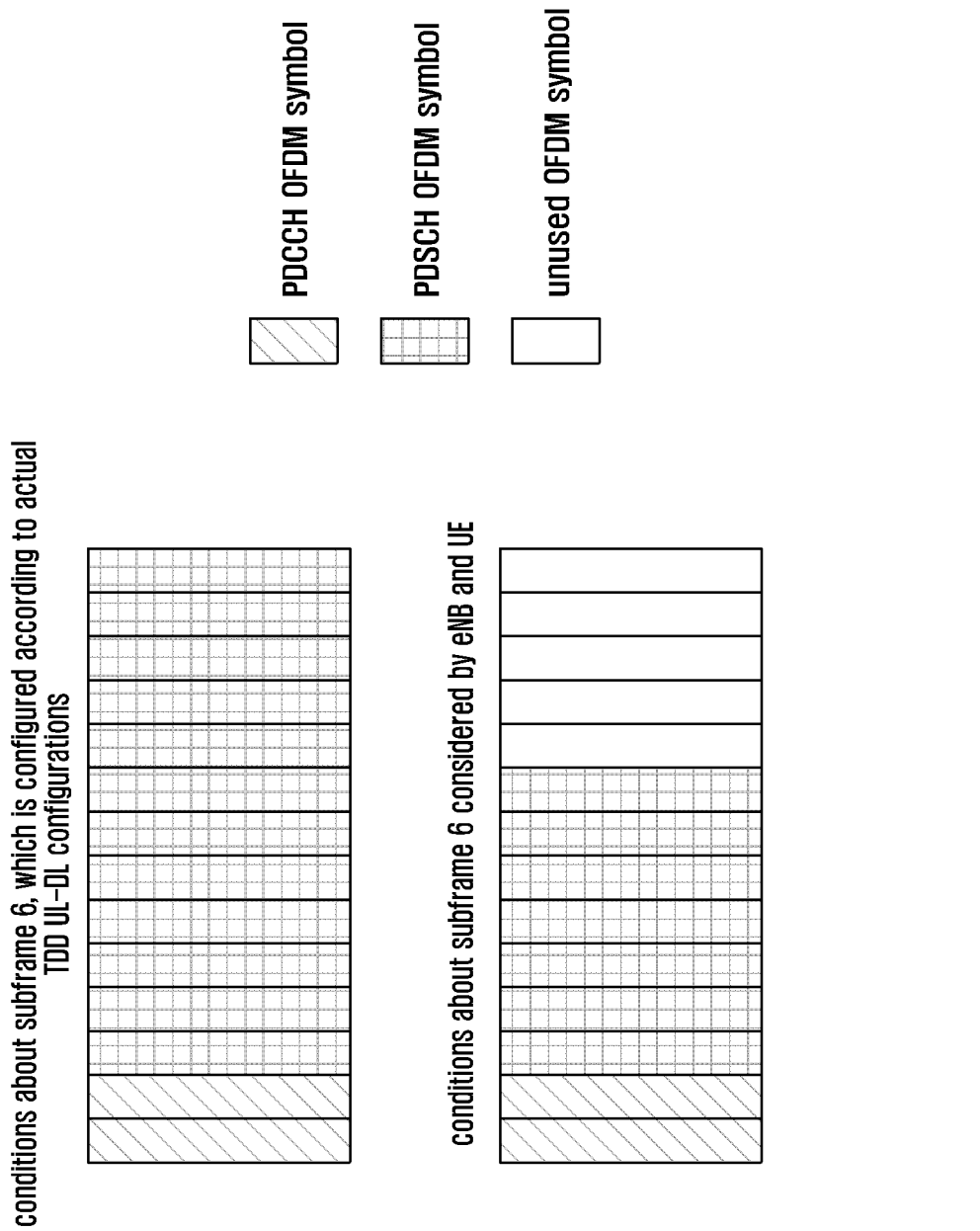
FIG. 6 is a schematic diagram illustrating number of OFDM symbols used for the PDSCH transmission within subframe 6, when the TDD UL-DL configurations change dynamically, in the second scene of the second method of the present disclosure.

Scenario 2:

When subframe 6 is a normal downlink subframe, according to the actual TDD UL-DL configuration, after receiving the PDSCH, the UE may process the PDSCH taking into consideration that subframe 6 is a special subframe. That is, number of OFDM symbols used for the PDSCH transmission may be obtained as follows. Subtract number of OFDM symbols used for the control area transmission of the PDCCH from 14 OFDM symbols to obtain an intermediate result. And then, subtract number of OFDM symbols of GP and UpPTS from the intermediate result, in which the number of OFDM symbols occupied by the GP and UpPTS is same as that in subframe 1, as shown in FIG. 6.

In a sixth embodiment, suppose the TDD UL-DL configuration indicated by SIB1 is TDD UL-DL configuration 5, subframes 3, 4, 7, 8 and 9 are flexible subframes, and subframe 6 is a normal downlink subframe. When the actual TDD UL-DL configuration dynamically turns into TDD UL-DL configuration 1, subframe 6 becomes a special subframe at this time. When calculating the number of OFDM symbols used for the PDSCH transmission, the UE may consider that subframe 6 is a special subframe. Thus, the number of OFDM symbols used for the PDSCH transmission may be obtained as follows. Subtract the number of OFDM symbols occupied by control area of the PDCCH indicated by the CFI from 14 OFDM symbols to obtain an intermediate result. And then, subtract the number of OFDM symbols of GP and UpPTS from the intermediate result. Suppose the number of OFDM symbols occupied by the control area of the PDCCH indicated by the CFI is 2, suppose the number of OFDM symbols of GP and UpPTS is 5, the number of OFDM symbols used for the PDSCH transmission finally determined is, 14−2−5=7.

Based on above embodiments, in the technical solution provided by embodiments of the present invention, the subframe type of subframe 6 may be indicated with specific information, when the TDD UL-DL configuration changes. Alternatively, suppose the subframe type of subframe 6 used for the PDSCH transmission is always the special subframe, it may ensure that the UE to explicitly learn number of OFDM symbols used for the PDSCH transmission within subframe 6. Meanwhile, it may ensure that the UE and eNB not to confuse the number of OFDM symbols used for the PDSCH transmission. Besides, for a backward compatible UE, for example, the UE supporting LTE version 8, or version 9, or version 10, when the eNB schedules subframe 6 to perform the PDSCH transmission, it may ensure that the actual subframe type of the subframe is consistent with subframe type of subframe 6, which is in the TDD UL-DL configuration indicated by SIB1.

The foregoing is only preferred embodiments of the present invention, which are not used for limiting the present invention. Any modifications, equivalent substitutions and improvements made within the spirit and principle of the present invention, should be covered by the protection scope of the present invention.

The invention claimed is:

1. A method for processing Physical Downlink Shared Channel (PDSCH) data, to be applied in a system which supports to dynamically adjust uplink and downlink (UL-DL) configurations for Time Division Multiplexing (TDD), wherein the method comprises:
   receiving, by a User Equipment (UE), a System Information Block 1 (SIB1);
   obtaining, by the UE, from the SIB1 a TDD UL-DL configuration employed by the UE in current system, wherein the UE doesn't support dynamic service adaption;
   determining, by the UE, subframe type of subframe 6, wherein the subframe type of subframe 6 is a special subframe or a normal downlink subframe; and
   determining, by the UE, number of Orthogonal Frequency Division Multiplexing (OFDM) symbols used for PDSCH transmission within subframe 6, based on the subframe type of subframe 6, and processing the PDSCH data of subframe 6.

2. The method according to claim 1, wherein determining by the UE the subframe type of subframe 6 comprises:
   determining, by the UE, the subframe type of subframe 6 with indication of specific information, when the TDD UL-DL configuration changes.

3. The method according to claim 2, wherein the specific information comprises a Control Format Indicator (CFI) in a Physical Control Format Indicator Channel (PCFICH) and the TDD UL-DL configuration indicated by the SIB1, and the specific information is to indicate the subframe type of subframe 6, when the TDD UL-DL configuration changes.

4. The method according to claim 3, further comprising:
   under the circumstances that bandwidth of a downlink system is larger than 10 Resource Blocks (RBs), and the subframe type of subframe 6 corresponding to the TDD UL-DL configuration indicated by the SIB1 is the special subframe;
   when CFI value in the PCFICH of subframe 6 is 1, the subframe type of subframe 6 being indicated as the special subframe, and number of the OFDM symbols used for control area transmission of a Physical Downlink Control Channel (PDCCH) within subframe 6 being 1;
   when the CFI value in the PCFICH of subframe 6 is 2, the subframe type of subframe 6 being indicated as the special subframe, and the number of the OFDM symbols used for the control area transmission of the PDCCH within subframe 6 being 2;
   when the CFI value in the PCFICH of subframe 6 is 3, the subframe type of subframe 6 being indicated as the normal downlink subframe, and the number of the OFDM symbols used for the control area transmission of the PDCCH within subframe 6 being 1;
   when the CFI value in the PCFICH of subframe 6 is 4, the subframe type of subframe 6 being indicated as the normal downlink subframe, and the number of the OFDM symbols used for the control area transmission of the PDCCH within subframe 6 being 2, as shown in Table 8;
   under the circumstances that the bandwidth of the downlink system is larger than 10 RBs, and the subframe type of subframe 6 corresponding to the TDD UL-DL configuration indicated by the SIB1 is the normal downlink subframe;
   when the CFI value in the PCFICH of subframe 6 is 1, the subframe type of subframe 6 being indicated as the normal downlink subframe, and the number of the OFDM symbols used for the control area transmission of the PDCCH within subframe 6 being 1;
   when the CFI value in the PCFICH of subframe 6 is 2, the subframe type of subframe 6 being indicated as the normal downlink subframe, and the number of the OFDM symbols used for the control area transmission of the PDCCH within subframe 6 being 2;
   when the CFI value in the PCFICH of subframe 6 is 3, the subframe type of subframe 6 being indicated as the special subframe, and the number of the OFDM symbols used for the control area transmission of the PDCCH being 1;
   when the CFI value in the PCFICH of subframe 6 is 4, the subframe type of subframe 6 being indicated as the special subframe, and the number of the OFDM symbols used for the control area transmission of the PDCCH being 2, as shown in Table 8;
   wherein in Table 8, S represents the special subframe, D represents the normal downlink subframe;
   "SIB1=S" represents that subframe 6 corresponding to the TDD UL-DL configuration indicated by the SIB1 is the special subframe;
   "SIB1=D" represents that subframe 6 corresponding to the TDD UL-DL configuration indicated by the SIB1 is the normal downlink subframe;
   "n, S" represents that subframe 6 is the special subframe, and the number of the OFDM symbols used for the control area transmission of the PDCCH within subframe 6 is n; and
   "n, D" represents that subframe 6 is the normal downlink subframe, and the number of the OFDM symbols used for the control area transmission of the PDCCH within subframe 6 is n

TABLE 8

| Subframe type | CFI = 1 | CFI = 2 | CFI = 3 | CFI = 4 |
|---|---|---|---|---|
| SIB1 = S | 1, S | 2, S | 1, D | 2, D |
| SIB1 = D | 1, D | 2, D | 1, S | 2, S. |

5. The method according to claim 3, further comprising:
   under the circumstances that bandwidth of a downlink system is smaller than or equal to 10 Resource Blocks (RBs), and the subframe type of subframe 6 corresponding to the TDD UL-DL configuration indicated by the SIB1 is the special subframe;
   when CFI value in the PCFICH of subframe 6 is n1, the subframe type of subframe 6 being indicated as the special subframe, and the number of the OFDM symbols used for the control area transmission of the PDCCH within subframe 6 being 2;

when the CFI value in the PCFICH of subframe 6 is n2, the subframe type of subframe 6 being indicated as the normal downlink subframe, and the number of the OFDM symbols used for the control area transmission of the PDCCH within subframe 6 being 2, as shown in Table 9;

under the circumstances that the bandwidth of the downlink system is smaller than or equal to 10 RBs, and the subframe type of subframe 6 corresponding to the TDD UL-DL configuration indicated by the SIB1 is the normal downlink subframe;

when the CFI value in the PCFICH of subframe 6 is n1, the subframe type of subframe 6 being indicated as the normal downlink subframe, and the number of the OFDM symbols used for the control area transmission of the PDCCH within subframe 6 being 2;

when the CFI value in the PCFICH of subframe 6 is n2, the subframe type of subframe 6 being indicated as the special subframe, and the number of the OFDM symbols used for the control area transmission of the PDCCH within subframe 6 being 2, as shown in Table 9;

wherein n1=1, 2, 3 or 4, n2=1, 2, 3 or 4, and n1≠n2;

in Table 9, S represents the special subframe, and D represents the normal downlink subframe;

"SIB1=S" represents that subframe 6 corresponding to the TDD UL-DL configuration indicated by the SIB1 is the special subframe;

"SIB1=D" represents that subframe 6 corresponding to the TDD UL-DL configuration indicated by the SIB1 is the normal downlink subframe;

"2, S" represents that subframe 6 is the special subframe, and the number of the OFDM symbols used for the control area transmission of the PDCCH within subframe 6 is 2; and "2, D" represents that subframe 6 is the normal downlink subframe, and the number of the OFDM symbols used for the control area transmission of the PDCCH within subframe 6 is 2

TABLE 9

| Subframe type | CFI = n1 | CFI = n2 |
|---|---|---|
| SIB1 = S | 2, S | 2, D |
| SIB1 = D | 2, D | 2, S. |

6. The method according to claim 3, further comprising:
under the circumstances that bandwidth of a downlink system is larger than 10 Resource Blocks (RBs), and the subframe type of subframe 6 corresponding to the TDD UL-DL configuration indicated by the SIB1 is the special subframe;

when CFI value in the PCFICH of subframe 6 is 1, the subframe type of subframe 6 being indicated as the special subframe, and the number of the OFDM symbols used for the control area transmission of the PDCCH within subframe 6 being 1;

when the CFI value in the PCFICH of subframe 6 is 2, the subframe type of subframe 6 being indicated as the special subframe, and the number of the OFDM symbols used for the control area transmission of the PDCCH within subframe 6 being 2;

when the CFI value in the PCFICH of subframe 6 is 3, the subframe type of subframe 6 being indicated as the normal downlink subframe, and the number of the OFDM symbols used for the control area transmission of the PDCCH within subframe 6 being fixed, which is 1 or 2;

the CFI value in the PCFICH of subframe 6 being 4, which represents reserved, as shown in Table 10;

under the circumstances that the bandwidth of the downlink system is larger than 10 RBs, and the subframe type of subframe 6 corresponding to the TDD UL-DL configuration indicated by the SIB1 is the normal downlink subframe;

when the CFI value in the PCFICH of subframe 6 is 1, the subframe type of subframe 6 being indicated as the normal downlink subframe, and the number of the OFDM symbols used for the control area transmission of the PDCCH within subframe 6 being 1;

when the CFI value in the PCFICH of subframe 6 is 2, the subframe type of subframe 6 being indicated as the normal downlink subframe, and the number of the OFDM symbols used for the control area transmission of the PDCCH within subframe 6 being 2;

when the CFI value in the PCFICH of subframe 6 is 3, the subframe type of subframe 6 being indicated as the special subframe, and the number of the OFDM symbols used for the control area transmission of the PDCCH within subframe 6 being fixed, which is 1 or 2;

wherein the CFI value in the PCFICH of subframe 6 is 4, which represents reserved, as shown in Table 10;

wherein in Table 10, S represents the special subframe, D represents the normal downlink subframe;

"SIB1=S" represents that subframe 6 corresponding to the TDD UL-DL configuration indicated by the SIB1 is the special subframe;

"SIB1=D" represents that subframe 6 corresponding to the TDD UL-DL configuration indicated by the SIB1 is the normal downlink subframe;

"n, S" represents that subframe 6 is the special subframe, and the number of the OFDM symbols used for the control area transmission of the PDCCH within subframe 6 is n; and "n, D" represents that subframe 6 is the normal downlink subframe, and the number of the OFDM symbols used for the control area transmission of the PDCCH within subframe 6 is n

TABLE 10

| Subframe type | CFI = 1 | CFI = 2 | CFI = 3 | CFI = 4 |
|---|---|---|---|---|
| SIB1 = S | 1, S | 2, S | D, which is applied when the number of OFDM symbols used for the PDCCH is fixed, such as 1 or 2 | reserved |
| SIB1 = D | 1, D | 2, D | S, which is applied when the number of OFDM symbols used for the PDCCH is fixed, such as 1 or 2. | reserved |

7. The method according to claim 2, wherein the specific information comprises a padding bit or a new domain in a Physical Downlink Control Channel (PDCCH), and the specific information is to indicate the subframe type of subframe 6, when the TDD UL-DL configuration changes.

8. The method according to claim 7, wherein determining by the UE the subframe type of subframe 6 comprises:
determining, by the UE, the subframe type of subframe 6, by using 1 padding bit or the new domain of 1 bit in the PDCCH;

when 1 padding bit or the new domain of 1 bit in the PDCCH indicates subframe 6 is the special subframe, and the UE processes the PDSCH data of subframe 6, treating, by the UE, subframe 6 as the special subframe;
determining the number of the OFDM symbols used for the PDSCH transmission within subframe 6 comprises:
subtracting the number of the OFDM symbols used for the control area transmission of the PDCCH from 14 OFDM symbols to obtain an intermediate result; and
subtracting number of the OFDM symbols of Guard Period (GP) and Uplink Pilot Time Slot (UpPTS) from the intermediate result;
when 1 padding bit or the new domain of 1 bit in the PDCCH indicates that subframe 6 is the normal downlink subframe, and the UE processes the PDSCH data of subframe 6, treating, by the UE, subframe 6 as the normal downlink subframe, and
determining the number of the OFDM symbols used for the PDSCH transmission within subframe 6 comprises:
subtracting a number of OFDM symbols used for the control area transmission of the PDCCH from 14 OFDM symbols.

9. The method according to claim 2, further comprising:
indicating the subframe type of subframe 6 with Radio Resource Control (RRC) signaling, when the TDD UL-DL configuration changes;
when the RRC signaling indicates that subframe 6 is the special subframe, and the UE processes the PDSCH data of subframe 6, treating, by the UE, subframe 6 as the special subframe, and determining the number of the OFDM symbols used for the PDSCH transmission within subframe 6 comprises:
subtracting a number of OFDM symbols used for the control area transmission of the PDCCH from 14 OFDM symbols to obtain an intermediate result; and
subtracting a number of the OFDM symbols of Guard Period (GP) and Uplink Pilot Time Slot (UpPTS) from the intermediate result;
when the RRC signaling indicates that subframe 6 is the normal downlink subframe, and the UE processes the PDSCH data of subframe 6, treating, by the UE, subframe 6 as the common downlink subframe, and
determining the number of the OFDM symbols used for the PDSCH transmission within subframe 6 comprises:
subtracting the number of OFDM symbols used for the control area transmission of the PDCCH from 14 OFDM symbols.

10. The method according to claim 2, further comprising:
providing, by an evolved Node B (eNB), a range set about dynamic change of the TDD UL-DL configuration, when initiating the dynamic change of the TDD UL-DL configuration with Radio Resource Control (RRC) signaling;
when each of TDD UL-DL configurations in the set comprises 2 switching points, and the UE processes the PDSCH data of subframe 6, treating, by the UE, subframe 6 as the special subframe, and
determining the number of OFDM symbols used for the PDSCH transmission within subframe 6 comprises:
subtracting the number of OFDM symbols used for the control area transmission of the PDCCH from 14 OFDM symbols to obtain an intermediate result; and
subtracting the number of the OFDM symbols of Guard Period (GP) and Uplink Pilot Time Slot (UpPTS) from the intermediate result;
when each of TDD UL-DL configurations in the set comprises 1 switching point, and the UE processes the PDSCH data of subframe 6, treating, by the UE, subframe 6 as the normal downlink subframe, and
determining the number of the OFDM symbols used for the PDSCH transmission within subframe 6 comprises:
subtracting the number of the OFDM symbols used for the control area transmission of the PDCCH from 14 OFDM symbols;
when the TDD UL-DL configuration in the set comprises 2 switching points or 1 switching point, and the UE processes the PDSCH data of subframe 6, treating, by the UE, subframe 6 as the special subframe, and
determining the number of the OFDM symbols used for the PDSCH transmission within subframe 6 comprises:
subtracting the number of the OFDM symbols used for the control area transmission of the PDCCH from 14 OFDM symbols to obtain an intermediate result; and
subtracting the number of the OFDM symbols of the GP and UpPTS from the intermediate result.

11. The method according to claim 2, wherein determining by the UE the subframe type of subframe 6 with indication of specific information, when the TDD UL-DL configuration changes comprises:
indicating the subframe type of subframe 6 with Media Access Control (MAC) signaling, when the TDD UL-DL configuration changes;
when the MAC signaling indicates that subframe 6 is the special subframe, and the UE processes the PDSCH data of subframe 6, treating, by the UE, subframe 6 as the special subframe, and
determining the number of the OFDM symbols used for the PDSCH transmission within subframe 6 comprises:
subtracting a number of OFDM symbols used for the control area transmission of the PDCCH from 14 OFDM symbols to obtain an intermediate result; and
subtracting a number of the OFDM symbols of Guard Period (GP) and Uplink Pilot Time Slot (UpPTS) from the intermediate result;
when the MAC signaling indicates that subframe 6 is the normal downlink subframe, and the UE processes the PDSCH data of subframe 6, treating, by the UE, subframe 6 as the normal downlink subframe, and
determining the number of the OFDM symbols used for the PDSCH transmission within subframe 6 comprises:
subtracting the number of the OFDM symbols used for the control area transmission of the PDCCH from 14 OFDM symbols.

12. The method according to claim 1, further comprising:
Assumption in advance that subframe 6 is always a special subframe, when the TDD UL-DL configuration changes, and determining the number of the OFDM symbols used for the PDSCH transmission within subframe 6 comprises:
subtracting a number of the OFDM symbols used for the control area transmission of the PDCCH from 14 OFDM symbols to obtain an intermediate result; and
subtracting a number of the OFDM symbols of Guard Period (GP) and Uplink Pilot Time Slot (UpPTS) from the intermediate result.

* * * * *